United States Patent
Sixtoes

(10) Patent No.: US 12,449,076 B2
(45) Date of Patent: Oct. 21, 2025

(54) SWIVEL HOSE CONNECTION DEVICE

(71) Applicant: Todd Sixtoes, Sioux Falls, SD (US)

(72) Inventor: Todd Sixtoes, Sioux Falls, SD (US)

( * ) Notice: Subject to any disclaimer, the term of this patent is extended or adjusted under 35 U.S.C. 154(b) by 0 days.

(21) Appl. No.: 18/789,951

(22) Filed: Jul. 31, 2024

(65) Prior Publication Data
US 2024/0401729 A1 Dec. 5, 2024

Related U.S. Application Data

(63) Continuation-in-part of application No. 17/895,641, filed on Aug. 25, 2022, now Pat. No. 12,281,732.

(51) Int. Cl.
*F16L 27/08* (2006.01)

(52) U.S. Cl.
CPC ................ *F16L 27/0804* (2013.01)

(58) Field of Classification Search
CPC ....... F16L 27/08; F16L 27/0804; F16L 33/30; A47L 9/242
USPC ................................. 285/278, 280
See application file for complete search history.

(56) References Cited

U.S. PATENT DOCUMENTS

| | | | |
|---|---|---|---|
| 3,017,654 A * | 1/1962 | Allenby | A47L 9/242 285/280 |
| 3,994,042 A | 11/1976 | Zakis | |
| 4,345,805 A | 8/1982 | Finley | |
| 4,984,330 A * | 1/1991 | Berfield | A47L 9/242 285/376 |
| 5,039,133 A * | 8/1991 | Albrecht | F16L 37/084 285/298 |
| 5,472,346 A | 12/1995 | Gray | |
| 6,508,492 B2 * | 1/2003 | Nixon | F16L 27/0812 285/280 |
| 7,356,876 B2 | 4/2008 | Dant | |
| 9,545,182 B2 | 1/2017 | Hollis | |
| 10,655,767 B2 * | 5/2020 | Roper | F16L 27/0845 |
| 11,160,429 B2 | 11/2021 | Zhang | |
| 12,281,732 B2 * | 4/2025 | Sixtoes | A47L 9/242 |
| 2002/0043803 A1 * | 4/2002 | Kietzmann | F16L 27/0824 285/276 |

* cited by examiner

*Primary Examiner* — David Bochna

(57) ABSTRACT

A swivel hose connection device includes a spindle tube and a lip extending circumferentially outward from the spindle tube such that the spindle tube extends away from the lip. The spindle tube is extended through a swivel tube such that the lip inhibits the spindle tube from passing fully through the swivel tube. The swivel tube is freely rotatable on the spindle tube adjacent the lip. The spindle tube is extended through a fixed tube and is fixed to the spindle tube such that the fixed tube is fixed relative to the spindle tube. The swivel tube has an outer diameter greater than an outer diameter of the lip such that the swivel tube and the fixed tube are attachable to respective hose segments so the hose segments are independently rotatable relative to each other.

19 Claims, 5 Drawing Sheets

SWIVEL HOSE CONNECTION DEVICE

CROSS-REFERENCE TO RELATED APPLICATIONS

This application is a continuation in part and claims benefit under 35 U.S.C., Section 120 of U.S. application Ser. No. 17/895,641 filed Aug. 25, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to swivel joints and more particularly pertains to a new swivel joint for limiting kinking of a hose such as a vacuum hose.

(2) Description of Related Art Including Information Disclosed Under 37 CFR 1.97 and 1.98

The prior art relates to swivel joints. Known swivel joints allow hoses, such as used with a vacuum, to rotate relative to a vacuum unit. Known prior art does not anticipate the use of one or more swivel joints positioned in a hose to permit swiveling of hose segments to prevent kinking of the hose. Other known prior art comprises swivel connections for connecting water hoses to shower heads, spigots, and the like. These do not teach the use of multiple swivel joints in a hose, and more specifically in a vacuum hose between a vacuum and a dust generating device, wherein the swivel joints limit or prevent kinking of the hose.

BRIEF SUMMARY OF THE INVENTION

An embodiment of the disclosure meets the needs presented above by generally comprising a spindle tube and a lip extending circumferentially outward from the spindle tube such that the spindle tube extends away from the lip. The spindle tube is extended through a swivel tube such that the lip inhibits the spindle tube from passing fully through the swivel tube. The swivel tube is freely rotatable on the spindle tube adjacent the lip. The spindle tube is extended through a fixed tube and is fixed to the spindle tube such that the fixed tube is fixed relative to the spindle tube. The swivel tube has an outer diameter greater than an outer diameter of the lip such that the swivel tube and the fixed tube are attachable to respective hose segments so the hose segments are independently rotatable relative to each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
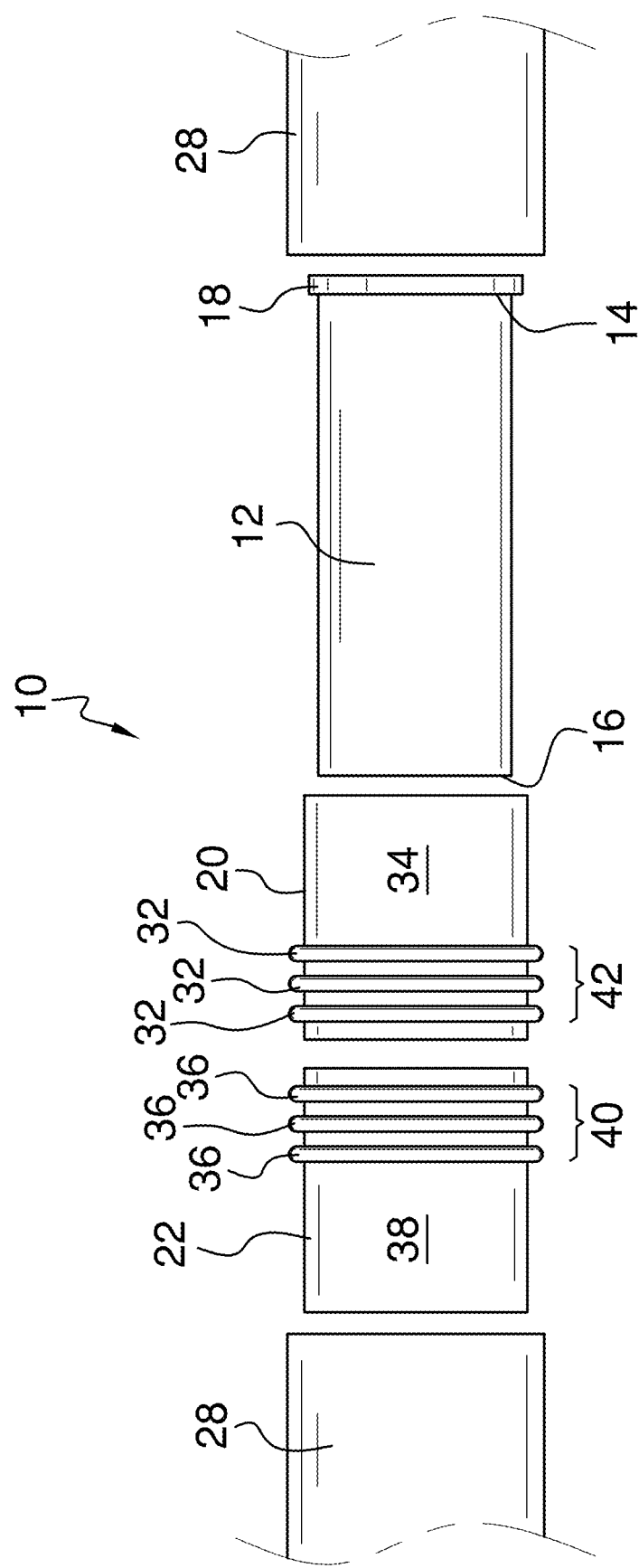
FIG. 1 is an exploded side view of a swivel hose connection device according to an embodiment of the disclosure.

With reference now to the drawings, and in particular to FIGS. 1 through 5 thereof, a new swivel hose connection device embodying the principles and concepts of an embodiment of the disclosure and generally designated by the reference numeral 10 will be described.

As best illustrated in FIGS. 1 through 5, the swivel hose connection device 10 generally comprises a spindle tube 12. The spindle tube 12 has a first end 14 and a second end 16. A lip 18 extends circumferentially outward from the spindle tube 12 such that the spindle tube 12 extends away from the lip 18. The lip 18 is positioned at the first end 14 of the spindle tube 12. The spindle tube 12 is extended through a swivel tube 20 such that the swivel tube 20 is positioned on the spindle tube 12 adjacent to the lip 18. The lip 18 inhibits the spindle tube 12 from passing fully through the swivel tube 20. The swivel tube 20 is freely rotatable relative to the spindle tube 12. The spindle tube 12 is extended through a fixed tube 22 such that the swivel tube 20 is positioned between the fixed tube 22 and the lip 18. The fixed tube 22 is fixed to the spindle tube 12 such that the fixed tube 22 is fixed relative to the spindle tube 12. The fixed tube 22 is secured to the spindle tube 12 by an adhesive 24 extending around the second end 16 of the spindle tube 12 and adhering the fixed tube 22 to the spindle tube 12. The fixed tube 22 may be fixed relative to the spindle tube in an alternative manner such as fusing the fixed tube 22 to the spindle tube 12 at the second end 16. The swivel tube 20 has an outer diameter greater than an outer diameter of the lip 18 such that the swivel tube 20 and the fixed tube 22 are each configured for being attached to respective hose segments 28 such that the hose segments 28 are independently rotatable relative to each other. The potential for free rotation of the hose segments 28 inhibits kinking of a hose 30 formed by a continuous interconnection of the hose segments 28.

The connection of the hose segment 28 to the swivel tube 20 can be enhanced by a swivel tube ridge 32 extending outwardly from an outer surface 34 of the swivel tube 20. Similarly, a fixed tube ridge 36 extends outwardly from an outer surface 38 of the fixed tube 22.

The swivel tube ridge 32 may be one of a plurality of parallel spaced swivel tube ridges 32 positioned on the swivel tube 20. The plurality of swivel tube ridges 32 may be evenly spaced within a ridge section 40 of the swivel tube 20. The fixed tube ridge 36 may be one of a plurality of parallel spaced fixed tube ridges 36 positioned on the fixed tube 22. The plurality of fixed tube ridges 36 may be evenly spaced within a ridge section 42 of the fixed tube 22. Alternatively, the swivel tube ridge 32 may be a single ridge extending spirally along the swivel tube 20 to define the ridge section 40 of the swivel tube 20. Similarly, the fixed tube ridge 36 may be a single ridge extending spirally along the fixed tube 22 to define the ridge section 42 of the fixed tube 22.

Figure 2:
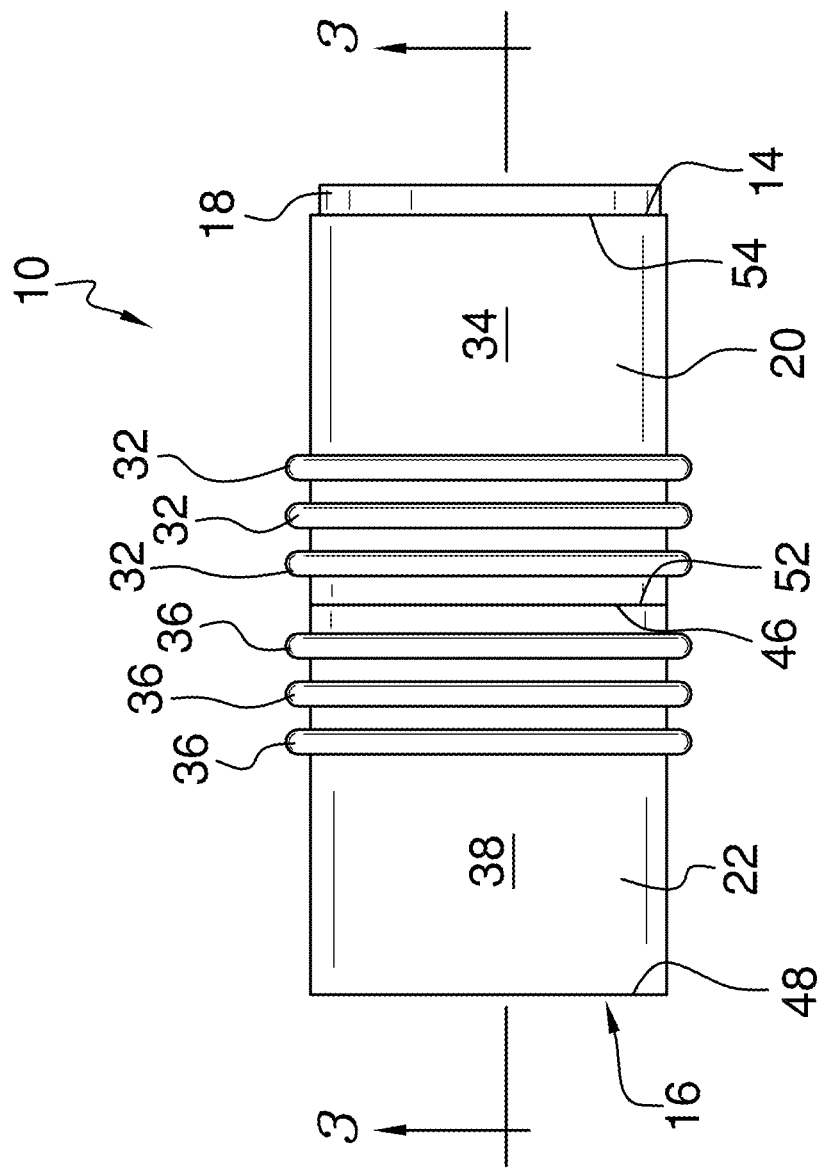
FIG. 2 is a side view of an embodiment of the disclosure.
Figure 3:
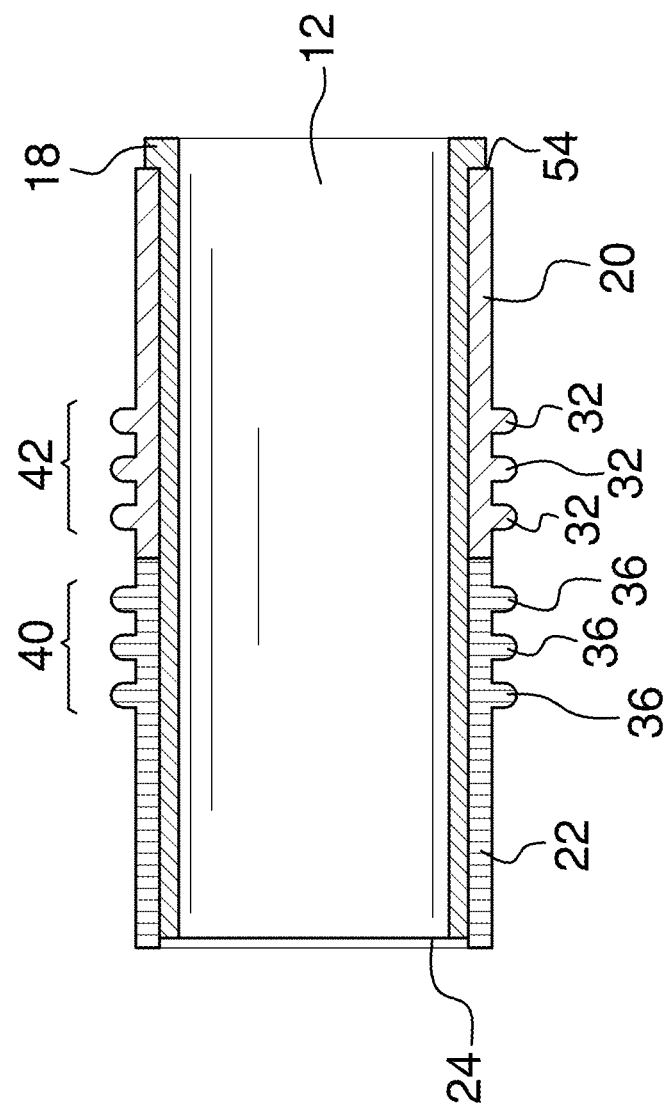
FIG. 3 is a cross-sectional view of an embodiment of the disclosure taken along line 3-3 of FIG. 2.
Figure 4:
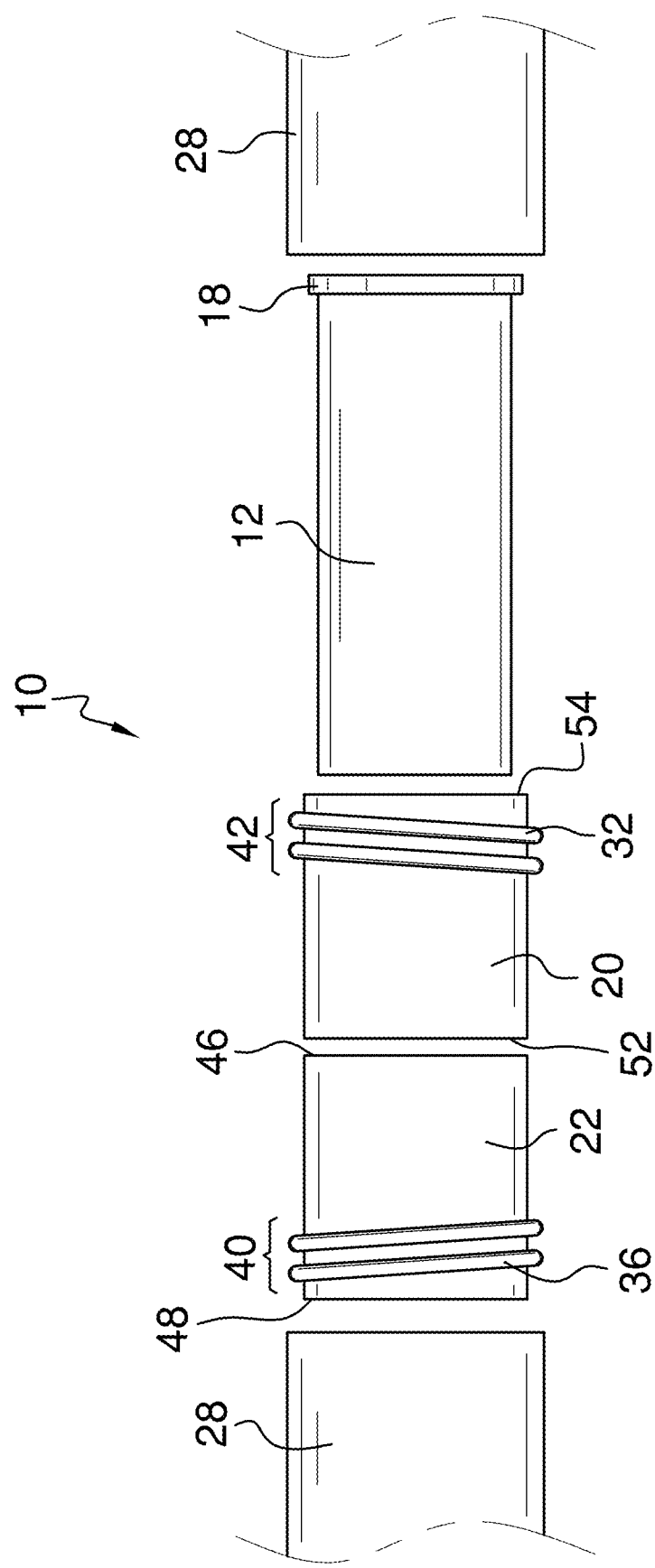
FIG. 4 is a side view of an embodiment of the disclosure.

Each of the swivel tube 20 and the fixed tube 22 may be positioned on the spindle tube 12 such that the ridge sections 40 and 42 are positioned adjacent to the first end 14 and second end 16 of the spindle tube 12, as shown in FIG. 4, or adjacent to each other spaced from the first end 14 and second end 16 of the spindle tube 12, as shown in FIG. 2. Depending on the positioning, the ridge section 42 of the fixed tube 22 may extend from a proximal end 46 of the fixed tube 22 relative to the lip 18 towards a distal end 48 of the fixed tube 22 relative to the lip 18. When the fixed tube 22 is alternatively positioned, the ridge section 42 of the fixed tube 22 extends from the proximal end 46 of the fixed tube 22 relative to the lip 18 towards the distal end 48 of the fixed tube 22 relative to the lip 18. Similarly, the ridge section 40 of the swivel tube 20 will extending alternatively from a distal end 52 of the swivel tube 20 relative to the lip 18 towards a proximal end 54 of the swivel tube 20 relative to the lip 18, or from the distal end 52 of the swivel tube 20 relative to the lip 18 towards a proximal end 54 of the swivel tube 20 relative to the lip 18. Although the configurations are shown with either multiple spaced parallel ridges or a single spiral ridge, it is understood and anticipated that each of the swivel tube 20 and fixed tube 22 may employ any of the ridge configurations discussed in any combination or orientation when the swivel tube 20 and fixed tube 22 are positioned on the spindle tube 12.

Figure 5:
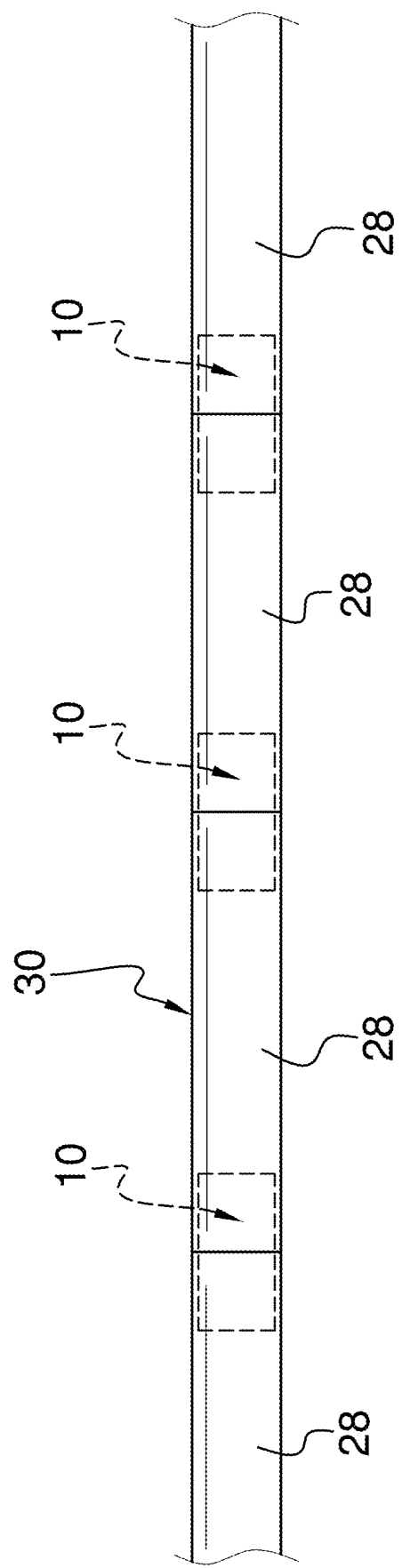
FIG. 5 is a front view of embodiments of the disclosure in use.

The above structure described further allows for a method of preventing kinks in the hose 30 using a plurality of the swivel hose connection devices 10 to interconnect a plurality of hose segments 28 as shown in FIG. 5.

In use, a desired number of hose segments 28 are joined using the swivel hose connection devices 10 until a desired length of the hose 30 is achieved. Free rotation of each hose segment 28 relative to immediately adjacent hose segments 28. The hose 30 may be incorporated into a conventional vacuum or used with a vacuum of the type integrated into a grinding, sanding, or surface finishing machine.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swivel hose connection device comprising:
    a spindle tube;
    a lip extending circumferentially outward from said spindle tube such that said spindle tube extends away from said lip;
    a swivel tube, said spindle tube being extended through said swivel tube such that said swivel tube is positioned on said spindle tube adjacent to said lip, said lip inhibiting said spindle tube from passing fully through said swivel tube, said swivel tube being freely rotatable relative to said spindle tube;
    a fixed tube, said spindle tube being extended through said fixed tube such that said swivel tube is positioned between said fixed tube and said lip, said fixed tube being fixed to said spindle tube wherein said fixed tube is fixed relative to said spindle tube; and
    wherein said swivel tube has an outer diameter greater than an outer diameter of said lip such that said swivel tube and said fixed tube are each configured for being attached to respective hose segments such that said hose segments are independently rotatable relative to each other.

2. The swivel hose connection device of claim 1, further comprising said spindle tube having a first end and a second end, said lip being positioned at said first end of said spindle tube.

3. The swivel hose connection device of claim 1, further comprising a swivel tube ridge extending outwardly from an outer surface of said swivel tube.

4. The swivel hose connection device of claim 3, further comprising said swivel tube ridge being one of a plurality of spaced swivel tube ridges positioned on said swivel tube.

5. The swivel hose connection device of claim 4, further comprising said plurality of swivel tube ridges being evenly spaced within a ridge section of said swivel tube.

6. The swivel hose connection device of claim 5, further comprising said ridge section of said swivel tube extending from a distal end of said swivel tube relative to said lip towards a proximal end of said swivel tube relative to said lip.

7. The swivel hose connection device of claim 3, further comprising said swivel tube ridge extending spirally along said swivel tube to define a ridge section of said swivel tube.

8. The swivel hose connection device of claim 7, further comprising said ridge section of said swivel tube extending from a distal end of said swivel tube relative to said lip towards a proximal end of said swivel tube relative to said lip.

9. The swivel hose connection device of claim 7, further comprising said ridge section of said swivel tube extending from a proximal end of said swivel tube relative to said lip towards a distal end of said swivel tube relative to said lip.

10. The swivel hose connection device of claim 1, further comprising a fixed tube ridge extending outwardly from an outer surface of said fixed tube.

11. The swivel hose connection device of claim 10, further comprising said fixed tube ridge being one of a plurality of spaced fixed tube ridges positioned on said fixed tube.

12. The swivel hose connection device of claim 11, further comprising said plurality of fixed tube ridges being evenly spaced within a ridge section of said fixed tube.

13. The swivel hose connection device of claim 12, further comprising said ridge section of said fixed tube extending from a proximal end of said fixed tube relative to said lip towards a distal end of said fixed tube relative to said lip.

14. The swivel hose connection device of claim 10, further comprising said fixed tube ridge extending spirally along said fixed tube to define a ridge section of said fixed tube.

15. The swivel hose connection device of claim 14, further comprising said ridge section of said fixed tube extending from a proximal end of said fixed tube relative to said lip towards a distal end of said fixed tube relative to said lip.

16. The swivel hose connection device of claim 14, further comprising said ridge section of said fixed tube extending from a distal end of said fixed tube relative to said lip towards a proximal end of said fixed tube relative to said lip.

17. A swivel hose connection device comprising:
- a spindle tube, said spindle tube having a first end and a second end;
- a lip extending circumferentially outward from said spindle tube such that said spindle tube extends away from said lip, said lip being positioned at said first end of said spindle tube;
- a swivel tube, said spindle tube being extended through said swivel tube such that said swivel tube is positioned on said spindle tube adjacent to said lip, said lip inhibiting said spindle tube from passing fully through said swivel tube, said swivel tube being freely rotatable relative to said spindle tube;
- a fixed tube, said spindle tube being extended through said fixed tube such that said swivel tube is positioned between said fixed tube and said lip, said fixed tube being fixed to said spindle tube wherein said fixed tube is fixed relative to said spindle tube; and
- wherein said swivel tube has an outer diameter greater than an outer diameter of said lip such that said swivel tube and said fixed tube are each configured for being attached to respective hose segments such that said hose segments are independently rotatable relative to each other;
- a swivel tube ridge extending outwardly from an outer surface of said swivel tube;
- a fixed tube ridge extending outwardly from an outer surface of said fixed tube.

18. The swivel hose connection device of claim 17, further comprising:
- said swivel tube ridge being one of a plurality of parallel spaced swivel tube ridges positioned on said swivel tube, said plurality of swivel tube ridges being evenly spaced within a ridge section of said swivel tube; and
- said fixed tube ridge being one of a plurality of spaced fixed tube ridges positioned on said fixed tube, said plurality of fixed tube ridges being evenly spaced within a ridge section of said fixed tube.

19. The swivel hose connection device of claim 17, further comprising:
- said swivel tube ridge extending spirally along said swivel tube to define a ridge section of said swivel tube; and
- said fixed tube ridge extending spirally along said fixed tube to define a ridge section of said fixed tube.

\* \* \* \* \*